United States Patent [19]

Stephenson et al.

[11] Patent Number: 4,502,659
[45] Date of Patent: Mar. 5, 1985

[54] COLLET-CONTAINING MOLD FOR UNDERCUT MOLDING

[75] Inventors: Ronald L. Stephenson, Lapel; Arthur G. Beer, Pendleton, both of Ind.

[73] Assignee: General Motors Corporation, Detroit, Mich.

[21] Appl. No.: 563,794

[22] Filed: Dec. 21, 1983

[51] Int. Cl.³ ............................ B29C 1/14; B29F 1/00
[52] U.S. Cl. .................................. 249/66 R; 425/441; 425/DIG. 5; 425/DIG. 58
[58] Field of Search ........... 249/66 R; 264/318, 328.1; 425/523, 533, 542, DIG. 5, DIG. 44, DIG. 58, 441, 440

[56] References Cited

U.S. PATENT DOCUMENTS

| 1,421,601 | 7/1922 | Speck | 425/441 |
|---|---|---|---|
| 1,642,947 | 9/1927 | Fischer | 425/447 |
| 2,367,962 | 1/1945 | Reibold et al. | 425/442 |
| 3,020,594 | 2/1962 | Makowski | 264/318 |
| 3,079,633 | 3/1963 | Fitz | 425/DIG. 5 |
| 3,504,403 | 4/1970 | Brown et al. | 425/541 |
| 3,825,389 | 7/1974 | Pott | 425/533 |
| 3,941,539 | 3/1976 | Saumsiegle et al. | 425/533 |
| 4,057,609 | 11/1977 | Uhlig | 425/533 |
| 4,209,160 | 6/1980 | Vanotti | 425/443 |

FOREIGN PATENT DOCUMENTS

| 194127 | 12/1957 | Austria | 425/DIG. 5 |
|---|---|---|---|
| 1344185 | 10/1963 | France | 425/DIG. 5 |
| 57-123017 | 7/1982 | Japan | 264/318 |

Primary Examiner—J. Howard Flint, Jr.
Attorney, Agent, or Firm—Lawrence B. Plant

[57] ABSTRACT

An injection molding mold including a collet-like mold member for shaping undercut portions of the molded article.

2 Claims, 7 Drawing Figures

COLLET-CONTAINING MOLD FOR UNDERCUT MOLDING

This invention relates to a mold for injection molding plastic articles and more particularly a mold for forming articles having undercut portions thereon.

BACKGROUND OF THE INVENTION

Injection molding molds typically comprise at least two mold parts which come together at a parting line to define a mold cavity into which the plastic is injected through appropriate orifices. After cooling, the mold parts are separated and the molded article ejected from the cavity. Complex shape articles typically require complex molds in the sense that many additional mold parts are required. Molded articles having undercut portions are a particular challenge to the mold designers as not only must additional mold parts be provided but usually means for moving those parts out of the way of the undercut must be provided to insure release of the molded article from the cavity. Hence the molds can become quite complex. Vanotti U.S. Pat. No. 4,209,160 and Reibold et al. U.S. Pat. No. 2,367,962, for example, illustrate molds where additional mold elements are provided to mechanically move or separate the cavity-forming mold parts to release a molded article having an undercut portion. Such additional mechanical elements unduly add to the complexity of the mold and often serve to limit or restrict the number of articles that could otherwise be molded in a single mold.

It is accordingly an object of the present invention to provide an injection molding mold for molding undercut articles which mold minimizes the number of individual mold parts needed to form the undercut-shaping portions of the mold cavity and to release the molded article therefrom. This and other objects and advantages of the present invention will become more readily apparent from the detailed description thereof which follows.

THE INVENTION

The invention comprehends an injection-molding mold including separable mold parts and a collet-like mold member having a molding head on one end thereof for shaping undercut portions of the molded article. The mold member reciprocates between a retracted article-molding position and an extended article-release position. The molding head nests within a conforming socket in one of the mold parts during molding and comprises a plurality of elastic finger-like segments which are stressfully held tightly together by the surrounding socket so as to define a portion of the molding cavity when the mold member is in the retracted position. In this regard, the finger-like segments are so designed that the elastic fingers flare axially outwardly in a relaxed unstressed condition but are stressed when deflected into contiguity to form the mold cavity. The segments are deflected into contiguity by retraction of the mold member into its associated mold part such that the molding head is drawn into the mating socket which serves to constrictively hold the segments together during molding. Extension of the collet-like mold member pushes the head out of the socket thereby allowing the elastic segments to spring outwardly and release the article. The outside surface of the molding head substantially conforms to the inside surface of the socket for a tight nesting fit therein. These complementary surfaces will preferably be conical such that upon retraction of the collet-like mold member into the mold part a wedging action serves to deflect the spring-like segments inwardly to form a molding cavity portion containing the undercut portion of the article being molded. The use of elastic finger-like segments to define the undercut molding head which segments flare outwardly when the constrictive force of the surrounding socket is removed substantially eliminates other means for spreading the undercut molding head apart for releasing the molded article.

DETAILED DESCRIPTION OF THE INVENTION

The invention may better be understood by reference to the following detailed description of a specific embodiment(s) thereof which is given hereafter in conjunction with the several drawings in which.

Figure 1:
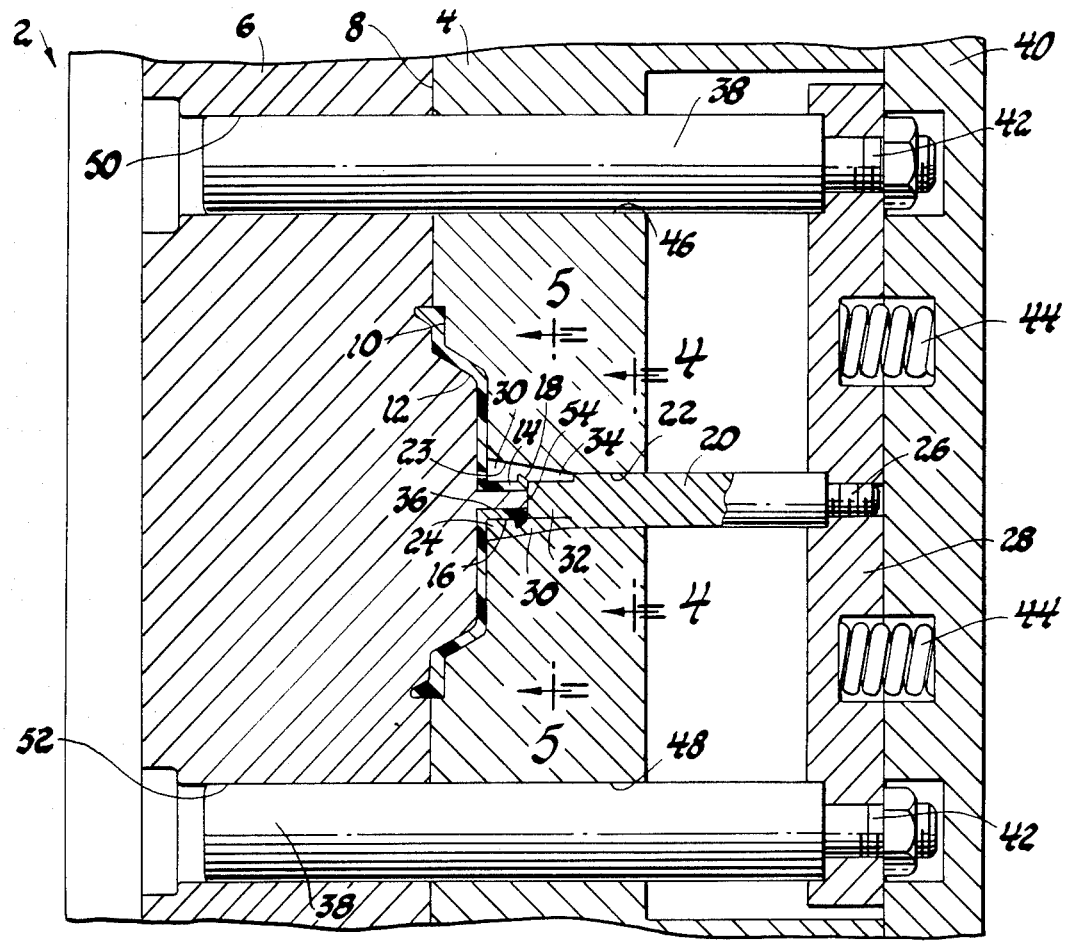
FIG. 1 is a partial, sectioned elevational view of a mold in the mold-closed position.
Figure 2:
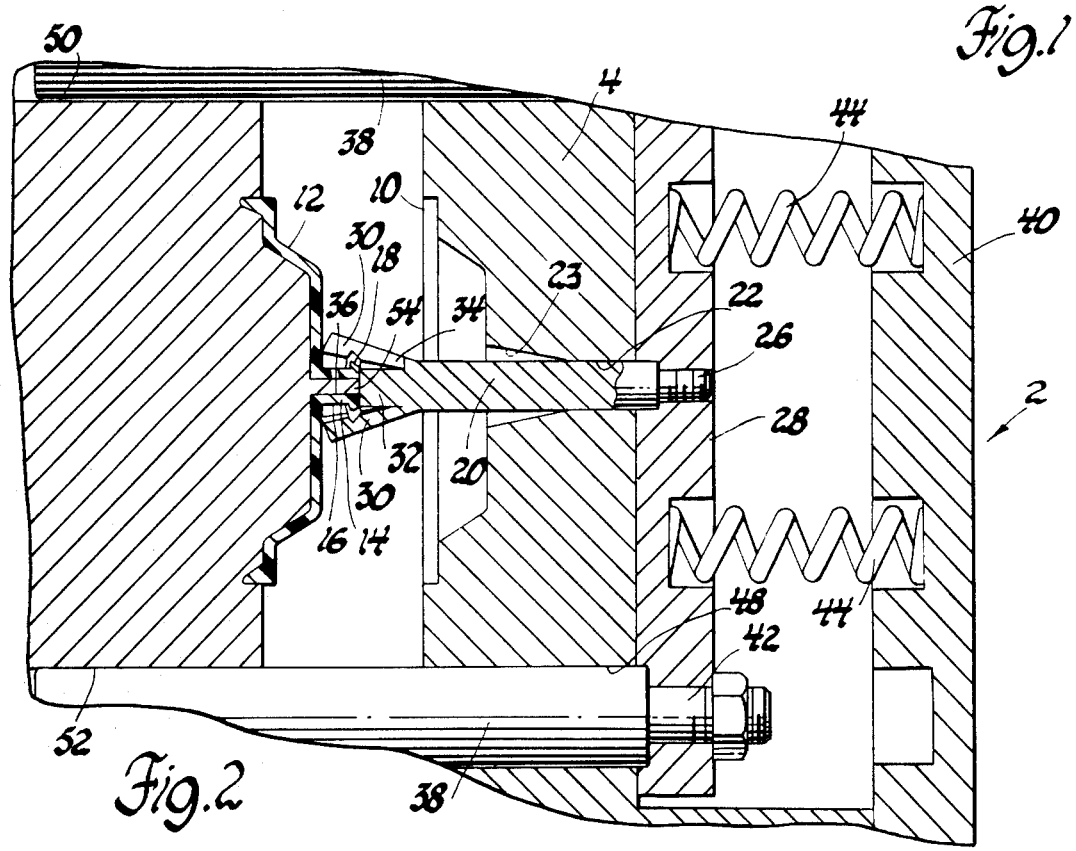
FIG. 2 is a view like that of FIG. 1 with the mold in a semi-open position.
Figure 3:
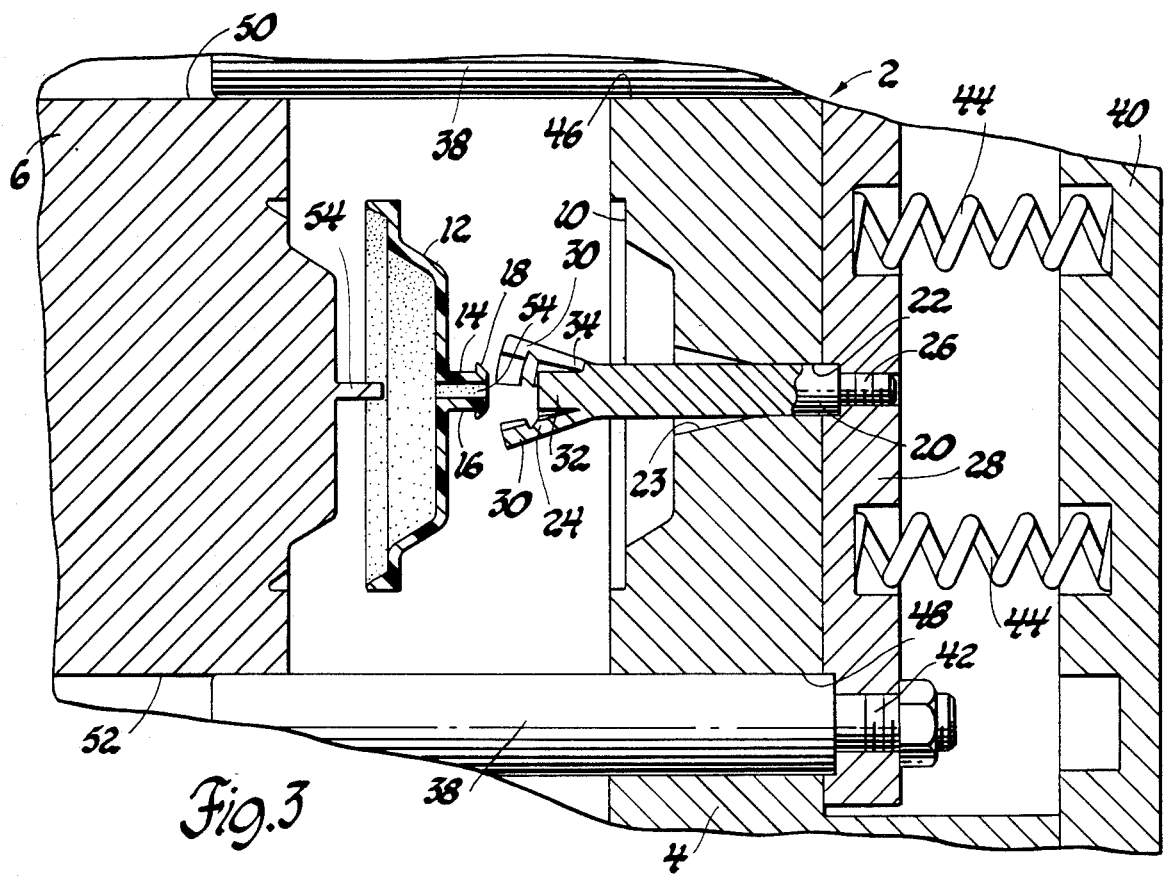
FIG. 3 is a view like FIGS. 1 and 2 with the mold in a fully open position.
Figure 4:
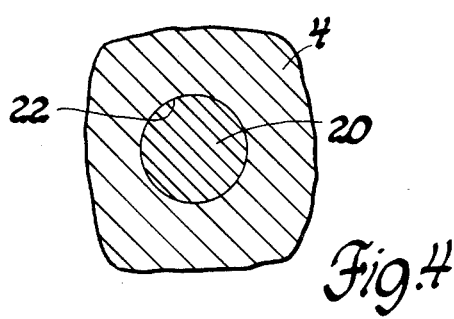
FIG. 4 is a sectioned view in the direction 4—4 of FIG. 1.
Figure 5:
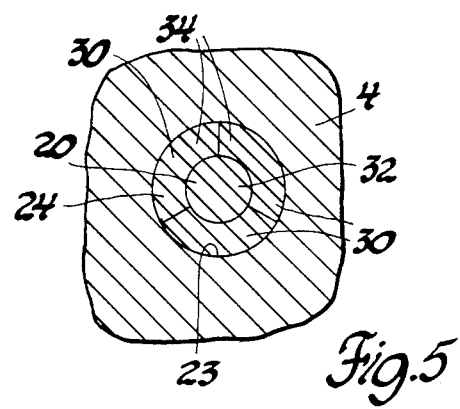
FIG. 5 is a sectioned view in the direction 5—5 of FIG. 1.

FIGS. 1–3 depict the molding-opening sequence of a mold having a collet-like mold member according to the present invention. More specifically and as best shown in FIG. 1, a separable mold 2 comprises a moveable female mold half 4 abutting a stationary male mold half 6 along a parting surface 8 therebetween. A mold cavity 10 formed between the abutting mold halves 4, 6 shapes an article 12 formed therein by injecting plastic into the cavity 10 through appropriate orifices not shown. The article 12 includes a tubular projection 14 having an annular undercut portion 16 and flange-like lip 18. To permit molding of the projection 14 without having the flange 18 hang up in the mold, a collet-like molding member 20 reciprocates in an opening 22 in the female mold half 4. A molding head 24, at one end of the member 20, nests tightly within a frusto conical socket 23 (i.e., during molding) in mold half 4 while a stud 26 at the other end of the member 20 anchors the member 20 to a retainer plate 28. While only one collet-like mold member 20 is depicted it is to be understood that many such members may be secured to the retainer plate 28 for movement therewith in a multi-cavity mold.

The molding head 24 portion of the collet-like mold member 20 is a segmented skirt comprising a plurality of elastic (i.e., spring-like) fingers or segments 30 which come together when the mold is closed to define a portion 36 of the mold cavity 10 for forming the projection 14. The elastic finger-like segments are rooted (34) to the mold member 20 about a narrow diameter stud 32 which projects between the segments to form the bottom of the mold cavity portion 36 within the molding head 24.

Guide pins 38 keep the several moving parts of the mold appropriately aligned during opening/closing of the mold 2 as will be discussed later herein. The female mold half 4 is permanently affixed to a drive plate 40 so as to move in unison therewith during opening/closing of the mold while the retainer plate 28 is rigidly affixed to the guide pins 38 by means of threaded studs 42. Compression springs 44 appropriately located between the plates 28 and 40 serve to bias the collet-like mold member 20 toward the stationary mold member 6 throughout all but the final stage of opening. The mold half 4 slides along the guide pins 38 during the initial opening of the mold 2 while the guide pins 38 slide in the bores 50 and 52 in the stationary mold half 6 during the final stage of opening (see FIG. 3).

Operationally molding and article ejection is as follows. The mold 2 is closed (FIG. 1) by pressing (i.e., via drive plate 40) the moveable mold half 4 firmly against the stationary mold half 6. At this time, guide pins 38 are deeply seated in the bores 50, 52 of the stationary mold half 6 and the compression springs 42, 44 are fully compressed to press the retainer plate 28, and associated collet-like mold member(s) 20, toward the stationary mold half 6 until the stud 32 abuts the tube-forming core piece 54 on the stationary mold. In this mold-closed position, the molding head 24 nests tightly within the conical socket portion 23 of the opening 22 in the moveable mold part 4 and has its elastic finger-like segments 30 tightly constructed thereby to form the molding cavity portion 36. An appropriate plastic is then injected into the cavity 10 to form the article 12.

After solidification of the article 12, the mold is opened and the article 12 ejected therefrom. As best shown in FIG. 2, the moveable mold part 4 initially moves away from the stationary mold part 6 under the driving influence of the driving plate 40. At this time, the compression springs 44 continue to press the retainer plate 28 and collet-like mold member(s) 20 toward the stationary mold part 6 and against the distal end of the core piece 54. This causes the moveable mold part 4 to slide along the shank of the collet-like mold member 20 and thereby unseat the molding head 24 from the cone-shaped socket 23. As a result, the constrictive force acting on the elastic finger-like segments 30 is removed and the segments flare radially outwardly to their natural, relaxed unstressed state. In this regard, the finger-like segments 30 need flare out only sufficiently to allow the annular lip 18 on the projection 14 to clear the molding cavity 36 formed within the molding head 24.

Finally as shown in FIG. 3, complete opening of the mold 2 and ejection of the article 12 is effected by moving the moveable mold portion 4 further away from the stationary mold half 6 so as to engage the underside of the retainer plate 28 and thereafter carry the plate 28 along with it. This in turn removes the molding head 24 from around the projection 14 to completely free the article 12 from the mold. Any convenient (e.g., mechanical or pneumatic) ejectors means may be used to dislodge the molded article 12 from the stationary male mold part 6.

Figure 6:
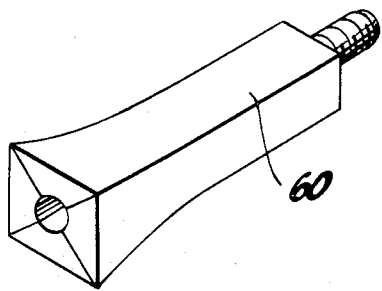
FIGS. 6 and 7 depict another embodiment of a collet-like mold member in accordance with the present invention in their respectively mold-closed and mold-open positions.
Figure 7:
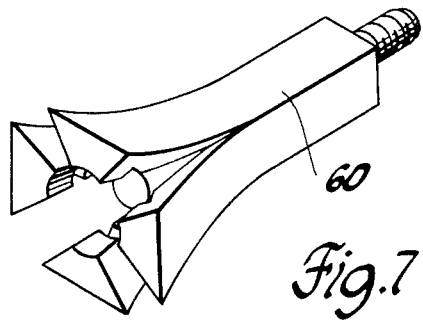

FIGS. 6 and 7 illustrate another embodiment of a collet-like mold member in accordance with the present invention, wherein the collet-like mold member 60 has a rectangular external configuration rather than the round configuration shown in FIGS. 1–5. As a practical matter, however, the round external configuration and cone-shaped complementary relationship between the outside of the molding head and the inside of the constricting socket are preferred for ease of manufacture and operation of the mold.

While the invention has been described primarily in terms of specific embodiments thereof it is not intended to be limited thereto but rather only to the extent set forth hereafter in the claims which follow.

The embodiments of the invention in which an exclusive property or privilege is claimed are defined as follows:

1. An injection molding mold comprising:

first and second relatively moveable parts coacting in a mold-closed position to define a molding cavity for shaping a molded article;

a socket in said first part adjacent said cavity for receiving and constrictively engaging a molding head while said mold is in said mold-closed position;

an elongated, collet-like mold member axially reciprocally moveable in said socket between a retracted article-forming position and an extended article-release position;

a self-opening molding head integral with and forming one end of said member, said head comprising a plurality of elastic, finger-like segments, said elastic segments (1) being flexed into a stressed condition and gathered together in contiguity one to the other by said socket to define a portion of said cavity when said member is moved into said retracted position and (2) springing outwardly under substantially their own power to a substantially unstressed condition to release said article when said member is moved into said extended position; and means for moving said member between its retracted and extended positions.

2. An injection molding mold comprising:

first and second relatively moveable parts coacting in a mold-closed position to define a molding cavity for shaping a molded article;

a substantially conical socket in said first part adjacent said cavity for receiving and constrictively engaging a molding head while said mold is in said mold-closed position;

an elongated, collet-like mold member axially reciprocally moveable in said socket between a retracted article-forming position and an extended article-release position;

a self-opening, cone-shaped molding head integral with and forming one end of said member to define a portion of said cavity in the mold-closed position, said head comprising a plurality of elastic, finger-like segments, said elastic segments (1) being flexed into a stressed condition and gathered together in contiguity one to the other by tightly nesting said cone-shaped head within said conical socket when said member is retracted and (2) springing outwardly under substantially their own power to a substantially unstressed condition to release said article when said member is extended; and means for retracting and extending said member.

* * * * *